United States Patent Office 3,346,562
Patented Oct. 10, 1967

3,346,562
METHOD FOR THE PRODUCTION OF RIBONUCLEOSIDE-5'-PHOSPHATE
Mikio Honjo, Takatsuki, and Ryuji Marumoto, Minoo, Japan, assignors to Takeda Chemical Industries, Ltd., Osaka, Japan
No Drawing. Filed May 31, 1966, Ser. No. 553,718
Claims priority, application Japan, May 29, 1965, 40/31,814
9 Claims. (Cl. 260—211.5)

This invention is concerned with a method for the production of ribonucleoside-5'-phosphate.

Ribonucleoside-5'-phosphate is very useful as condiment for food and also in the pharmaceutical industry, and has been chemically produced by at first protecting the hydroxyl groups at the 2'- and 3'-positions of its ribose moiety with acyl or isopropylidene groups and then phosphorylating the 5'-hydroxyl group of the thus-protected compound with pentavalent phosphorus compound such as phosphorus pentachloride, phosphorus oxychloride, etc., followed by removing the protecting groups.

However, this hitherto-known method requires a long time (about 7 to about 30 hours) for completing the protection and phosphorylation, and therefore is not desirable from an industrial viewpoint.

The present invention is addressed to the problem of providing an industrially feasible method for the chemical preparation of ribonucleoside-5'-phosphate and is based on the discovery that a selective phosphorylation of the 5'-hydroxyl group of the ribonucleoside can easily be completed in a short time by allowing the ribonucleoside to react with ketone or aldehyde and phosphorus trichloride in the presence of water and oxygen.

The object of the present invention is thus to provide a novel and commercially practical method for the production of ribonucleoside-5'-phosphate.

Another object of the invention is to chemically produce ribonucleoside-5'-phosphate in a short time and in a good yield from the corresponding ribonucleoside.

Briefly stated, the present method comprises allowing the ribonucleoside to react with phosphorus trichloride and aliphatic ketone having 3 to 6 carbon atoms or aromatic aldehyde in the presence of water and oxygen, and subsequently hydrolyzing the resulting product into ribonucleoside-5'-phosphate. The determinative factor is the use of phosphorus trichloride, i.e. a compound with trivalent phosphorus, as a starting material.

In this method, the reaction appears to proceed according to the following reaction scheme:

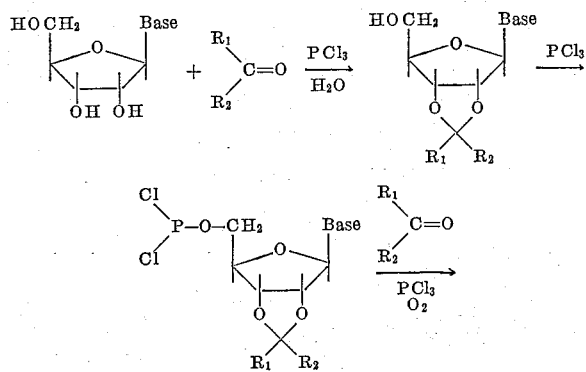

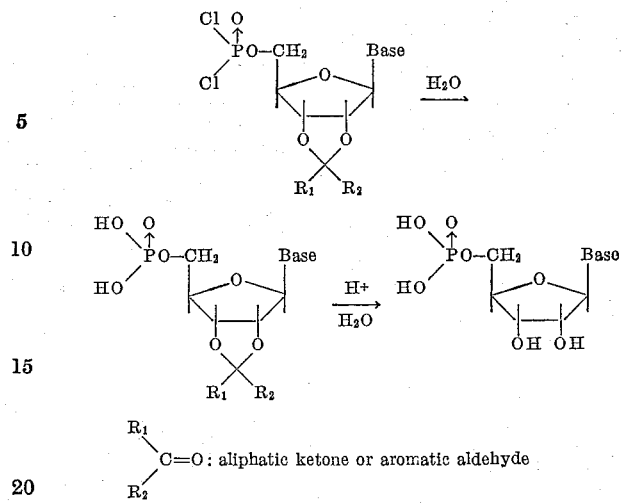

As "ribonucleoside" in the present method there are used those containing purine base such as adenosine, inosine, etc. or those containing pyrimidine base such as uridine, cytidine, etc. As the aliphatic ketone having 3 to 6 carbon atoms, there is employed acetone, methyl ethyl ketone, methyl isobutyl ketone, methyl isopropyl ketone, etc., and as aromatic aldehyde there is used e.g. benzaldehyde, tolualdehyde or naphthaldehyde.

Generally, the reaction is carried out by first dissolving or suspending the ribonucleoside into ketone or aldehyde and then adding phosphorus trichloride and water to the thus-prepared solution or suspension, leaving the reaction system in contact with the atmosphere or blowing oxygen or gas containing oxygen, such as air, into the reaction system.

As the ketone or aldehyde acts as a solvent, no other reaction solvent need be used. The ketone or aldehyde is used in such a volume as sufficiently dissolves or suspends the ribonucleoside and preferably is used in a large excess.

The mole ratio of phosphorus trichloride and water to the nucleoside may vary depending on the starting material, and generally ranges from about 10 to about 100 moles, preferably about 40 to about 60 moles, of phosphorus trichloride and about 2 to about 20 moles, preferably about 2 to about 4 moles, of water per one mole of the ribonucleoside.

All the necessary amount of phosphorus trichloride can be added to the reaction system at one time, but a much better yield is realized by adding the phosphorus trichloride to the reaction system in two batches. The latter procedure is carried out by adding at first about 1 to about 10 moles (desirably 1 to 2) of phosphorus trichloride per one mole of ribonucleoside together with about 2 to about 20 moles (desirably 2 to 4) of water per one mole of ribonucleoside to the reaction system to allow the reaction to take place until the reaction mixture becomes clear, and then to add about 10 to about 90 moles (desirably 40 to 60) of the phosphorus trichloride per one mole of ribonucleoside to the reaction mixture to further continue the reaction. In this case, the first reaction step does not necessarily require oxygen, but the latter reaction step must be carried out while contacting the reaction system with the atmosphere or while blowing in oxygen, air or the like.

The reaction is advantageously carried out under cooling, e.g., at a temperature of about 0 to about 10° C.

In the present method, the hydroxyl groups at the 2'- and 3'-positions on the ribose moiety are protected with the aliphatic ketone or aromatic aldehyde in the presence of phosphorus trichloride and water, and the free 5'-hydroxyl group is selectively phosphorylated by phosphorus trichloride and oxygen in the presence of aliphatic ketone or aromatic aldehyde.

Thus the corresponding protected ribonucleoside 5'-phosphorus chloride ester is obtained. The protected compound is then subjected to hydrolysis into ribonucleoside-5'-phosphate, for example, by adding the resulting product into ice water and adding alkaline material (e.g., sodium hydroxide, potassium hydroxide, sodium carbonate, etc.) to adjust the pH value to 1.0–2.0, and then heating the mixture at about 40 to 100° C., preferably 50 to 80° C.

Thus-resulting final product, i.e., ribonucleoside 5'-phosphate, can be isolated from the reaction mixture, for example, by means of using ion-exchange resins or activated carbon, or by crystalizing in a form of salt such as sodium salt.

As detailed above, by the present invention, ribonucleoside-5'-phosphate can be chemically produced in a short time and in good yield by very simple procedure.

For the purpose of showing the reaction time required for the present method, the following illustrative test data is given:

*Test data.*—To a suspension of 2 grams of inosine in 50 milliliters of acetone were added 3 milliliters of phosphorus trichloride and then 1 milliliter of water. The reaction mixture was stirred for 30 minutes under 20° C. 50 milliliters of phosphorus trichloride were then further added into the reaction mixture at 0 to 5° C. 0.1 milliliter test samples of the reaction solution were taken out at suitable intervals of time to check upon on the formation of inosine-5'-monophosphate (hereinafter referred to as 5'-IMP). The result is shown in the following table. The formation of 5'-IMP shows a fixed percentage (93%) at 60 minutes after the start of reaction.

| Time (minutes): | Formation of 5'-IMP, percent |
|---|---|
| 0 | 0 |
| 35 | 60 |
| 40 | 70 |
| 50 | 82 |
| 60 | 93 |
| 80 | 93 |

For the purpose of giving those skilled in the art a better understanding of the invention, the following illustrative examples of present preferred embodiments are given (parts by weight bear the same relation to parts by volume as do grams to milliliters):

*Example 1*

To a suspension of 2 parts by weight of inosine in 50 parts by volume of acetone were added with stirring 3 parts by volume of phosphorus trichloride and then 1 part by volume of water in this order. The reaction mixture was stirred, keeping the temperature at 10° C. for 30 minutes. To the reaction mixture was further added 40 parts by volume of phosphorus trichloride, keeping the temperature at 0–5° C. for 2 hours and leaving the reaction vessel open to the atmosphere. Then the reaction mixture was poured into 1000 parts by volume of ice water and the resultant solution was adjusted to pH 1.5 with a 20% aqueous solution of sodium hydroxide. This solution was kept at 70° C. for 30 minutes to remove isopropylidene groups protecting the 2'- and 3'-hydroxy groups. The thus-treated solution was adsorbed on an activated charcoal column. The column was washed with water and eluted with a 0.5% aqueous solution of sodium hydroxide. The eluate was adjusted to pH 8 and concentrated. Investigation of the concentrate by paper electrophoresis (0.05 mol borate buffer) showed that inosine-5'-monophosphate was produced in the yield of 88%. Methanol was added to the concentrate to give 3.3 parts by weight of disodium salt of inosine-5'-monophosphate. (Yield was 81%.)

*Example 2*

After a mixture of 2 parts by weight of adenosine dissolved in 50 parts by volume of acetone, 4 parts by volume of phosphorus trichloride and 2 parts by volume of water was allowed to react in the same way as in Example 1, 45 parts by volume of phosphorus trichloride was further added to the reaction mixture. Thus obtained reaction mixture was treated in the same way as in Example 1 to give 2.3 parts by weight of disodium salt of 5'-adenylic acid. Yield was 61%.

*Example 3*

After a mixture of 2 parts by weight of cytidine dissolved in 100 parts by volume of acetone, 3 parts by volume of phosphorus trichloride and 1 part by volume of water was allowed to react in the same way as in Example 1, 50 parts by volume of phosphorus trichloride was further added to the reaction mixture. The thus-obtained reaction mixture was treated in the same way as in Example 1 to give 2.8 parts by weight of disodium salt of 5'-cytidylic acid. Yield was 75%.

*Example 4*

The mixture of 2 parts by weight of inosine, 4 parts by volume of phosphorus trichloride, 20 parts by volume of benzaldehyde and 2 parts by volume of water was treated in the same way as in Example 1. 40 parts by volume of phosphorus trichloride was added to the reaction mixture. The thus-obtained reaction mixture was treated in the same way as in Example 1 to give 1.4 parts by weight of disodium salt of 5'-inosinic acid. (Yield 34%.)

*Example 5*

To a suspension of 2 parts by weight of inosine in 50 parts by volume of acetone were added 3 parts by volume of phosphorus trichloride and then 1 part by volume of water. The mixture was stirred at 10° C. for 30 minutes, and then 50 parts by volume of phosphorus trichloride was added at 0 to 5° C. The mixture was reacted for 30 minutes. The reaction mixture was treated as in Example 1 to give 3.2 parts by weight of disodium salt of 5'-inosinic acid. (Yield 80%.)

*Example 6*

2 parts by weight of inosine, 70 parts by volume of acetone, 40 parts by volume of phosphorus trichloride and 1 part by volume of water were simultaneously mixed. The mixture was allowed to react for 2 hours at 0 to 5° C. The reaction mixture was treated as in Example 1 to give 3 parts by weight of disodium salt of inosinic acid. (Yield 75%.)

*Example 7*

After a mixture of 2 parts by weight of uridine, 50 parts by volume of acetone, 3 parts by volume of phosphorus trichloride and 1 part by volume of water was treated in the same way as in Example 1, 50 parts by volume of phosphorus trichloride was added to the reaction mixture. The thus-obtained reaction mixture was treated in the same way as in Example 1 to give 2.9 parts by weight of disodium salt of 5'-uridylic acid. (Yield 80%.)

*Example 8*

To a suspension of 2 parts by weight of inosine in 50 parts by volume of methyl ethyl ketone were added 3 parts by volume of phosphorus trichloride and then 1 part by volume of water. After the reaction mixture was stirred at 10° C. for 30 minutes, 50 parts by volume of phosphorus trichloride was added to the reaction mixture and the reaction mixture was stirred for 30 minutes in an open vessel. Then the reaction mixture was poured into 1000 parts by volume of ice water and the resultant solution was adjusted to pH 1.5 with a 20% aqueous solution of sodium hydroxide. This solution was heated to 70° C. for 30 minutes to remove isopropylidene group. The solution was adsorbed on an activated charcoal column. The colunn was washed with water and eluated with a 0.5% aqueous solution of sodium hydroxide. The eluate was adjusted to pH 8 and concentrated. The small amount of this concentrate was examined by paper electrophoresis (0.05 mol borate buffer). This showed that inosine-5'-monophosphate was produced in the yield of 81%. Methanol was added to the concentrate to give 3.0 parts by weight of disodium salt of insoine-5'-monophosphate. (Yield 74%.)

*Example 9*

The mixture of 2 parts by weight of inosine, 4 parts by volume of phosphorus trichloride, 20 parts by volume of methyl isobutyl ketone and 2 parts by volume of water was treated in the same way as in Example 8. 40 parts by volume of phosphorus trichloride was added to the reaction mixture. The thus-obtained reaction mixture was treated in the same way as in Example 8 to give 2.9 parts by weight of disodium salt of 5'-inosinc acid. (Yield 71%.)

What is claimed is:

1. A method for producing ribonucleoside-5'-phosphate from the corresponding ribonucleoside, which comprises allowing the ribonucleoside to react with aliphatic ketone having 3 to 6 carbon atoms and having the formula

wherein each of $R_1$ and $R_2$ is alkyl, and with phosphorus trichloride in the presence of water and oxygen, and subsequently hydrolyzing the resulting product into ribonucleoside-5'-phosphate.

2. The method as claimed in claim 1, wherein the ribonucleoside is inosine.

3. The method as claimed in claim 1, wherein the ribonucleoside is adenosine.

4. The method as claimed in claim 1, wherein the ribonucleoside is cytidine.

5. The method as claimed in claim 1, wherein the ribonucleoside is uridine.

6. The method as claimed in claim 1, wherein the phosphorus trichloride is employed in an amount of about 10 to about 100 moles relative to the ribonucleoside and the water is employed in an amount of about 2 to about 20 moles relative to the ribonucleoside.

7. The method as claimed in claim 1, wherein the reaction between the ribonucleoside, the ketone and the phosphorus trichloride is carried out by first adding about 2 to about 20 moles of water and about 1.0 to about 10 moles of phosphorus trichloride relative to the ribonucleoside dissolved or suspended in the ketone to allow a reaction to take place, and then, upon completion of said reaction, adding about 10 to about 90 moles of phosphorus trichloride relative to the ribonucleoside to the reaction mixture to allow the reaction to continue while assuring the presence of oxygen.

8. A method for producing ribonucleoside-5'-phosphate from the corresponding ribonucleoside, which comprises allowing the ribonucleoside to react with aromatic aldehyde having 7 to 11 carbon atoms and phosphorus trichloride in the presence of water and oxygen, and subsequently hydrolyzing the resulting product into ribonucleoside-5'-phosphate.

9. The method as claimed in claim 8, wherein the reaction between the ribonucleoside, the aldehyde and the phosphorus trichloride is carried out by first adding about 2 to about 20 moles of water and about 1.0 to about 10 moles of phosphorus trichloride relative to the ribonucleoside dissolved or suspended in the aldehyde to allow a reaction to take place, and then, upon completion of said reaction, adding about 10 to about 90 moles of phosphorus trichloride relative to the ribonucleoside to the reaction mixture to allow the reaction to continue while assuring the presence of oxygen.

References Cited

UNITED STATES PATENTS

| 2,978,479 | 4/1961 | Kayser et al. | 260—976 |
| 3,042,697 | 7/1962 | Halter et al. | 260—976 |
| 3,201,388 | 8/1965 | Tsuchiya et al. | 260—211.5 |
| 3,201,389 | 8/1965 | Fujimoto et al. | 260—211.5 |

LEWIS GOTTS, *Primary Examiner.*

J. R. BROWN, *Assistant Examiner.*